Sept. 20, 1932.  C. E. KAERCHER  1,878,402
NUT SHELL INLAY AND PROCESS OF INLAYING
Filed Jan. 23, 1932
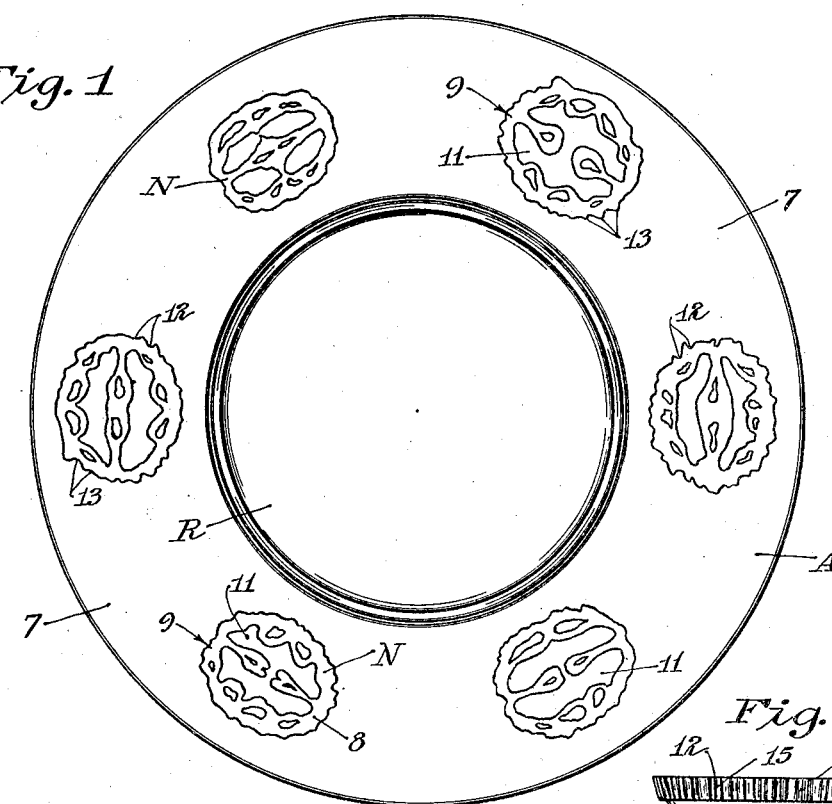
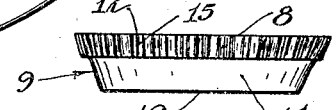
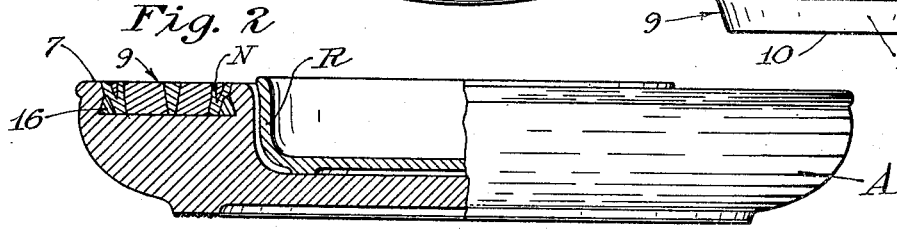
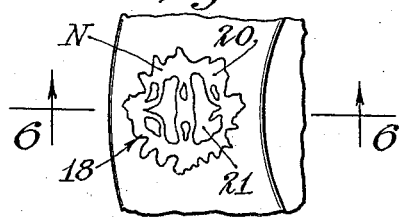
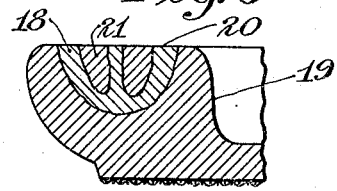
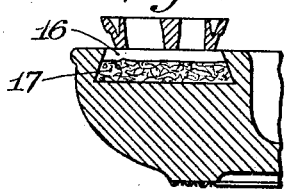
Inventor
Cecil E. Kaercher
By his Attorneys
Williamson & Williamson Patented Sept. 20, 1932

1,878,402

UNITED STATES PATENT OFFICE

CECIL E. KAERCHER, OF ORTONVILLE, MINNESOTA

NUT SHELL INLAY AND PROCESS OF INLAYING

Application filed January 23, 1932. Serial No. 588,326.

This invention relates to a product of manufacture which may be known as a nut shell inlay. It further relates to the process for inlaying an object having an irregular-shaped outer periphery such as a section of a nut shell in a body of material.

I have discovered that if transverse sections are cut through certain nuts such as walnuts of the black variety, butternuts, etc., the cut surfaces of the nut shells form beautiful and intricate designs. Each nut section forms a different design than any other nut section.

It is one of the main objects of the invention to produce such articles as ash trays, nut bowls, articles of furniture etc., having surfaces within which sections of the shells of such nuts as black walnuts, butternuts, etc., are inlaid to expose to view the beautiful patterns and designs created by sectioning the shells of these nuts.

It is a further object to provide novel processes for inlaying objects having irregular-shaped peripheries, such as nut shell sections in bodies of material such as wood.

To these ends, generally stated, the invention consists in the novel products of manufacture and in the novel processes and steps in processes hereinafter defined in the claims, and described in the following specification, made in connection with the accompanying drawing, wherein like reference characters refer to the same or similar parts throughout the various views, and, in which, Fig. 1 is a plan view illustrating an ash tray incorporating therein a number of the nut shell inlays of the present invention;

Fig. 2 is a view partly in side elevation and partly in vertical section taken through the ash tray shown in Fig. 1;

Fig. 3 is a view on an enlarged scale in side elevation of a nut shell section after it has been prepared for use in making a nut shell inlay;

Fig. 4 is a vertical section taken through a portion of the ash tray shown in Fig. 1 and illustrating how the parts will be positioned during one step of the process for producing the inlay;

Fig. 5 is a plan view of a portion of a nut inlaid ash tray wherein the nut shell section is molded into the body of the material forming the ash tray; and Fig. 6 is a vertical section taken on the line 6—6 of Fig. 5, as indicated by the arrows.

Referring first to Figs. 1, 2, 3 and 4, there is shown an ash tray A formed of wood and having a central recess within which a glass ash receiver R is placed. The top flat surface of the ash tray A may be designated by the numeral 7. A plurality of nut shell inlays N formed from black walnut are illustrated as being embedded in the ash tray A, so that these inlays will be exposed to view on the flat surface 7 of the ash tray. Although the inlays N may be embedded in any surface of practically any desired article, the invention may be described in connection with the ash tray A.

To produce the nut shell inlay N, a nut such as a black walnut is first preferably cut as by a saw transversely at its central portion or above or below its central portion, to produce a flat surface 8 in a section 9 of the nut shell. The section 9 of the shell may be again transversely cut as by means of a saw to form a second flat surface 10, which may be designated the bottom surface to distinguish the same from surface 8, which may be designated the top surface of the section. The two surfaces 8 and 10 will preferably be cut parallel to each other and the section 9 will be so taken through the nut that the surface 8 is considerably larger than the surface 10 and also so that the surface 8 is greater in area than any section that could be taken through the section 9 in a plane parallel to the plane of the surface 8. After the section 9 has been cut as specified, the meat of the nut is cleaned from the shell section, whereupon the interstices of the section previously occupied by the meat of the nut will be filled by a filler 11 colored preferably in sharp contrast to the coloring of the nut shell. Although various fillers 11 may be used, preferably a filler is used which will liquefy at a comparatively low temperature and which can be poured into the shell section at this temperature without burning the shell section 9 and which will harden to retain its shape and form under ordinary atmospheric temperatures. The filler 11 also will have approximately the same coefficient of expansion as the nut shell in connection with which it is used.

The peripheral surface of the nut shell 9 is quite irregular in contour and has formed thereon or therein, a plurality of grooves 12 and ridges 13. The lower portion of the peripheral surface of the nut shell section 9 is ground away by a buffing operation to produce the lower smooth peripheral portion 14 having no projecting ridges 13 extending outwardly beyond the ridges at the peripihery of the top surface 8. Above the smooth peripheral portion 14, the periphery of the section 9 is filed as by use of a triangular file to form grooves 15 which are continuations of the grooves 12 at the periphery of the top surface 8. Due to the natural curvature of the nut section, the ridges 13 at the periphery of the top surface 8 will then project outwardly beyond any portions of the periphery of the nut shell below the top surface. The nut section 9 when these various operations have been completed is ready to be inlaid in the ash tray A.

Preparatory to inlaying the nut shell section 9, in the ash tray A, a recess 16 is cut downwardly from the flat surface 7 of the ash tray. This recess, as best illustrated in Figs. 2 and 4, flares downwardly and outwardly from the flat surface 7. At the surface 7 the recess 16 is of a size slightly less than the size of the top surface 8 of the nut shell section 9 and it is shaped to roughly conform in configuration to the shape of the top surface 8. The depth of the recess 16 corresponds to the thickness of the shell section 9.

Preparatory to inlaying the shell section 9 within the prepared recess 16 of the ash tray 8, a filler such as a wood filler 17 is disposed within the recess 16. The shell section 9 is then carried to the position shown in Fig. 4 over the recess 16 whereupon it is allowed to rest within the recess. The shell section 9 is then pressed firmly into the recess 16 until the top surface 8 of the shell section lies approximately flush with the flat surface 7. As the shell section is pressed in place, the ridges 13 at the periphery of the top surface 8 will embed themselves in the wood adjacent the top of the recess 16 thereby causing the wood to closely fill the various grooves 12 of the nut shell section. The nut shell section 9 will then take the position illustrated in Fig. 2 within the body of the ash tray A. The top surface 8 of the nut shell section 9 may then be buffed so that this surface lies absolutely flush and even with the flat surface 7. The ash tray may now be shellacked or varnished or otherwise finished as desired.

When the shell section 9 has been inlaid as described, the beautiful design formed by the top surface 8 of the shell section will be exposed to view. As the filler 11 sharply contrasts with the nut shell, the design will be clearly brought out. The wood of the ash tray will closely abut the periphery of the top surface 8 to produce an exceedingly neat and attractive inlay N. Preferably several inlays will be simultaneously formed in the ash tray or other article which is being made.

In Figs. 5 and 6, there is illustrated a nut shell section 18 which is molded into a body 19 of originally plastic material which has set and hardened. The nut shell section 18 is produced by transversely cutting a nut such as a butternut (as illustrated) or a black walnut to produce a flat surface 20. The meat of the nut is then removed from the nut shell section 18 whereupon a filler 21 is inserted in place in the nut shell section to take the place of the meat of the nut. The filled nut shell section may be embedded within the body 19 so that the surface 20 will lie flush with the top surface of the body, at the time that the body is cast.

It will be understood that, if desired, the fillers 11 and 21 may be eliminated and it will also be understood that in producing the inlay N, the steps of buffing the periphery of the nut shell section 9 to produce the smooth portion 14 and the grooves 15 may be eliminated if desired. It is seen that an attractive product of manufacture is obtained by use of my processes.

It will, of course, be understood that different kinds of nuts may be used for producing the inlays and that inlays may be made in many different kinds of articles. It will also be understood that instead of cutting the nut shell to produce the bottom surface 10, the rounding bottom of the shell may be left intact.

What is claimed is:—

1. A product of manufacture, comprising a section of a nut shell having a cut surface and a body within which said section of nut shell is inlaid to expose the cut surface of the nut shell section to view on one face of said body.

2. A product of manufacture, comprising a nut shell section in which the meat of the nut has been removed, said shell section having a cut surface, a filler filling said nut section and a body within which said filled nut section is inlaid to expose the cut surface of said shell section to view on one face of said body.

3. The process of inlaying a hard member in a body of softer material, said hard member having an irregular-shaped outer periphery and tapering downwardly from a flat upper surface which consists in first cutting a downwardly and outwardly flaring recess in the body of softer material from one face thereof, said recess at said face being slightly smaller in size than the upper surface of said hard member but corresponding roughly in contour to the shape of the upper surface of said hard member, then placing said hard member so that the lower portion thereof is disposed within said recess and then pressing said hard member further into said recess until the upper surface of said hard member lies substantially flush with the said face of said body to cause the irregular-shaped outer periphery of the hard member to be embedded within said body.

4. The process of producing a nut shell inlay, which consists in first slicing a nut shell to produce a nut shell section having a larger cut upper surface than the lower surface of the section, then recessing a body in which the shell section is to be inlaid by cutting a downwardly and outwardly flaring recess in said body from one surface thereof, said recess being of a size at the said surface of said body slightly smaller than the upper surface of said nut shell section and corresponding roughly in shape to the upper surface of said nut shell section, placing said nut shell section in place within said recess with the upper surface thereof uppermost and pressing said shell section further into the recess until the upper surface of the shell section lies substantially flush with the said surface of said body.

5. The process defined in claim 4, and filling said nut shell section with a filler contrasting sharply in color with the color of said nut shell section.

6. The process of producing a nut shell inlay, which consists in first slicing a nut shell to produce a nut shell section having a larger cut upper surface than the lower surface of the section, buffing off the irregularities on the lower periphery of the shell section to cause the shell section to taper from its upper surface toward the lower part thereof, recessing a body in which the shell section is to be inlaid by cutting a downwardly and outwardly flaring recess in said body from an upper face thereof, said recess being of a size at said face slightly smaller than the upper surface, of said nut shell section and corresponding roughly in shape to the shape of the upper surface of said nut shell section, placing said nut shell section within said recess with the upper surface of said shell section uppermost and pressing said shell section further into the recess until the upper surface of the shell section lies substantially flush with the said face of said body.

7. The process of producing a nut shell inlay, which consists in first slicing a nut shell having a grooved outer periphery to produce a nut shell section having a larger cut upper surface than the lower surface of the section, then buffing the lower portion of the periphery of said shell section to such an extent that the irregularities on the periphery at the upper surface of said shell section project outwardly beyond all portions of the shell section therebeneath, then grooving the outer periphery of the shell section adjacent the upper surface thereof downwardly in line with the grooves appearing on the periphery of the upper surface of the shell section, then recessing a body in which the shell section is to be inlaid by cutting a downwardly and outwardly flaring recess in said body from an upper face thereof, said recess being of a size at said face slightly smaller than the upper surface of said nut shell section and corresponding roughly in shape to the shape of the upper surface of said nut shell section, placing said nut shell section within said recess with the upper surface of said shell section uppermost and pressing said shell section further into the recess until the upper surface of the shell section lies substantially flush with the said face of said body to embed the grooves at the periphery of the upper surface of the shell section within said body.

In testimony whereof I affix my signature.

CECIL E. KAERCHER.